United States Patent [19]

Yoshida et al.

[11] Patent Number: 4,585,917

[45] Date of Patent: Apr. 29, 1986

[54] METHOD FOR RELIEVING RESIDUAL STRESSES BY BUILD-UP WELDING OVER OUTER SURFACE OF PIPE

[75] Inventors: Kazuo Yoshida; Tadahiro Umemoto, both of Yokohama, Japan

[73] Assignee: Ishikawajima-Harima Jukogyo Kabushiki Kaisha, Tokyo, Japan

[21] Appl. No.: 581,317

[22] Filed: Feb. 17, 1984

[30] Foreign Application Priority Data

Feb. 28, 1983 [JP] Japan .................................. 58-32542

[51] Int. Cl.$^4$ .............................................. B23K 9/04
[52] U.S. Cl. .................................. 219/76.1; 219/59.1
[58] Field of Search ................ 219/76.1, 76.12, 76.14, 219/59.1; 228/244

[56] References Cited

U.S. PATENT DOCUMENTS 4,049,186  9/1977  Hanneman et al. .......... 219/76.14 X

FOREIGN PATENT DOCUMENTS 33193  4/1981  Japan ................................. 219/76.1

Primary Examiner—C. L. Albritton
Assistant Examiner—Alfred S. Keve

[57] ABSTRACT

The outer surface of a butt-welded joint is build-up welded such that a ratio h/t is higher than approximate 0.2 and a ratio $L/\sqrt{Rt}$ is higher than approximate 1, where h denotes height of a build-up welded portion; t, wall thickness of a pipe; L, width of the build-up welded portion; and R, radius of the pipe. As a result, the residual stresses in the build-up welded portion counterbalances the residual stresses in the welded joint, whereby the residual stresses at the inner surface of the welded joint can be relieved.

1 Claim, 7 Drawing Figures

METHOD FOR RELIEVING RESIDUAL STRESSES BY BUILD-UP WELDING OVER OUTER SURFACE OF PIPE

BACKGROUND OF THE INVENTION

The present invention relates to a method for relieving residual stresses of an inner surface of a weld by build-up welding of an outer surface of the butt welded joint between pipe sections.

When the pipe sections are butt welded, high tensile residual stresses are left in the weld and the heat affected zone. If the residual stresses are not relieved, stress corrosion cracking results so that in the cases of pipes and cylindrical or tubular vessels used in nuclear reactors, chemical plants or the like, there exists a fear that a serious accident will happen. Therefore, the residual stresses must be relieved. Generally the welded joints are subject to such heat treatments that the tensile residual stresses in the inner surface of the weld and the heat affected zone are relieved or converted into compressive residual stresses.

There are various conventional residual stress relief methods such as a high frequency heating process, a shot peening process and a (Linde) process for heating the outer surface of a pipe with flames. The high frequency heating process requires a large-sized equipment and a high frequency induction coil must be prepared for each pipe so that the high frequency heating process is expensive. Furthermore, the high frequency heating process requires many days. According to the shot peening process, the inner surface of a pipe must be subjected to the shot peening. Therefore, the shot peening process cannot be applied to a pipe in service. The Linde process cannot relieve the compressive residual stress in a stable manner.

In view of the above, the present invention provides a very simple yet very effective method for relieving residual stresses in a weld. According to the present invention, the outer surface of a weld is subjected to build-up welding under predetermined conditions.

DETAILED DESCRIPTION OF THE PREFERRED EMBODIMENT

Figure 1:
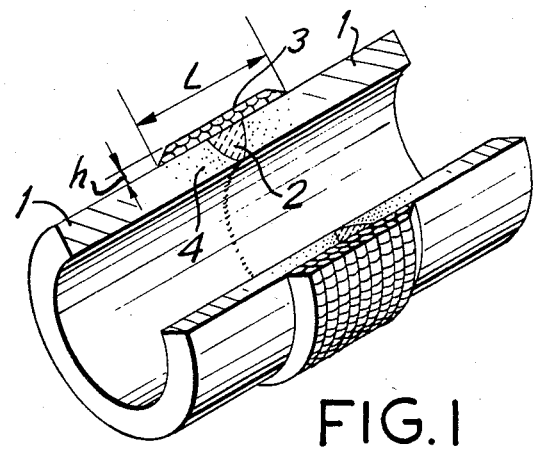
FIG. 1 is a view showing a welded joint to which is applied the present invention.

Referring first to FIG. 1, according to the present invention, the outer surface of a weld 2 between pipe sections 1 is build-up welded so that the weld 2 and a heat affected zone 4 are displaced in both the axial and circumferential directions by the thermal compression of a build-up welded portion 3, whereby the residual stresses can be relieved.

In order that the tensile residual stresses of the inner surfaces of the weld 2 and the heat affected zone 4 may be satisfactorily relieved or the tensile residual stresses may be converted into compressive residual stresses, the width L and the height h of the build-up welded portion 3 must satisfy predetermined requirements depending upon the diameter and wall thickness of the pipe section 1.

Next the conditions for build-up welding for relieving the residual stresses will be described.

Figure 2:
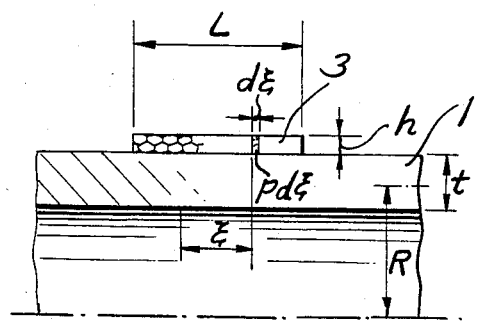
FIG. 2 is a view used to explain the build-up welding in accordance with the present invention.

As shown in FIG. 2, when the outer surface of the pipe 1 is build-up welded over the distance L, the build-up welded portion 3 is compressed. As a result, the load per unit length in the circumferential direction of the pipe becomes $pd\epsilon$, where p is the pressure when the pipe 1 is compressed toward the axis thereof.

Due to the load $pd\epsilon$ the pipe is clasped on its outer surface so that the bending moment is developed. The axial stress at the inner surface of the pipe at the center of the build-up welded portion 3 which is developed by the bending moment is given by $$\sigma_{ab} = 1.82p \cdot (R/T) \cdot e^{-\beta b} \sin \beta b \quad (1)$$

And in like manner, the circumferential stress is given by $$\sigma_{cb} = \nu \sigma_{ab} \quad (2)$$

where $\beta^4 = 3(1 - \nu^2)/(R^2 T^2)$

R: the mean radius of a pipe,
t: the thickness of the wall of the pipe,
$\nu$: poisson's ratio, and
b: the length of one-half of the build-up welded portion.

When the build-up welded portion 3 is compressed or shrinked in both the circumferential and axial directions, the pipe 1 is deformed. As a result, the stresses are developed. The circumferential stress is given by $$\sigma_{cw} = -p(R/t)(1 - e^{-\beta b} \cos \beta b) \quad (3)$$

and if the length L of the build-up welded portion is sufficiently long, the axial stress is given by $$\sigma_{bw} = -\nu \sigma_{cw} \quad (4)$$

Figure 3:
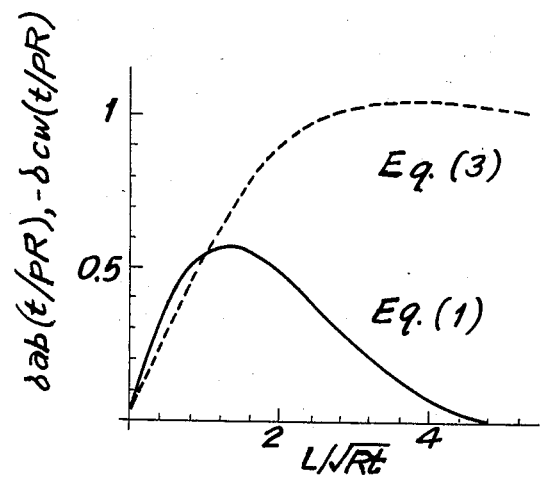
FIG. 3 is an analytical model showing the residual stresses resulting from the build-up welding, the stresses being obtained from equations.

The stress $\sigma_{ab}$ given by Eq. (1) is the tensile stress at the inner surface of the pipe 1 while the stress $\sigma_{cw}$ is the compressive stress given by Eq. (3) at the inner surface of the pipe 1. Both the tensile and compressive stresses are a function of the length L. That is, the longer the length L, the less tensile the stress $\sigma_{ab}$ becomes while the more compressive $\sigma_{cw}$ becomes. It follows therefore that in order to convert the stresses developed at the inner surface of the pipe 1 into the desired compressive stresses, the length L of the build-up welded portion must be greater than a predetermined value. Furthermore the stresses developed are dependent upon the radius R and the wall thickness t. FIG. 3 shows the relationship between $L/\sqrt{Rt}$ and the stresses $\sigma_{ab}$ and $\sigma_{cw}$. $\sigma_{ab}(t/pR)$ and $-\sigma_{cw}(t/pR)$ are plotted along the ordinate.

The pressure p is developed by the residual stresses of the build-up welded metal and is given by $$p = \sigma_y(h/R) \quad (5)$$

where $\sigma_y$ is the residual stress of the build-up welded metal ($\approx$ yield strength) and
h is the height of the build-up welded portion. From Eqs. (3) and (5), $$\sigma_{cw} = -\sigma_y(h/t)(1-e^{-\beta b}\cos\beta b) \quad (6)$$

From Eq. (6), it is seen that the compressive stress $\sigma_{cw}$ at the inner surface is in proportion to the yield strength of the build-up welded metal and h/t. A welded metal has the specific yield strength, so that if the same material is used the stress $\sigma_{cw}$ is dependent upon the ratio h/t. It follows therefore that in order to obtain a a desired stress $\sigma_{cw}$, the ratio h/t must be suitably selected.

Therefore when the outer surface of the weld 2 is build-up welded with a suitable ratio h/t and a suitable ratio $L/\sqrt{Rt}$, the residual stresses at the inner surface of the weld 2 can be relieved.

The ratio h/t and the ratio $L/\sqrt{Rt}$ are obtained by the experiments so that the residual stresses may be satisfactorily relieved. The experiments were conducted with steel pipes.

Figure 4:
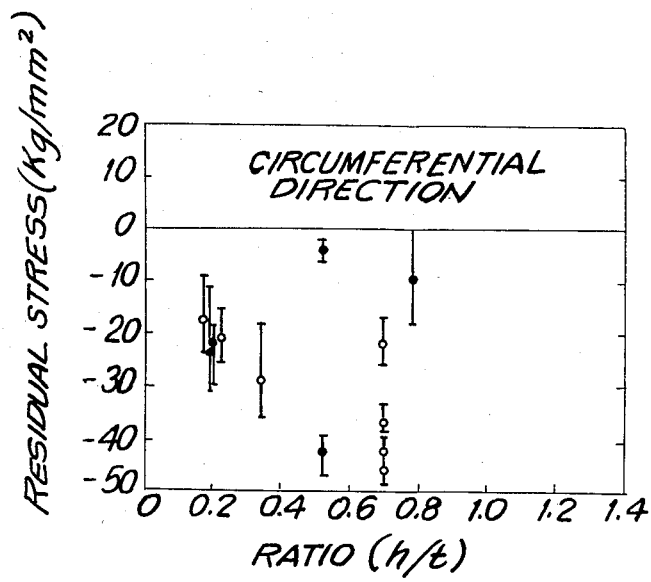
FIGS. 4, 5, 6 and 7 are graphs showing the residual stresses resulting from the build-up welding, the data being obtained by experiments.
Figure 5:
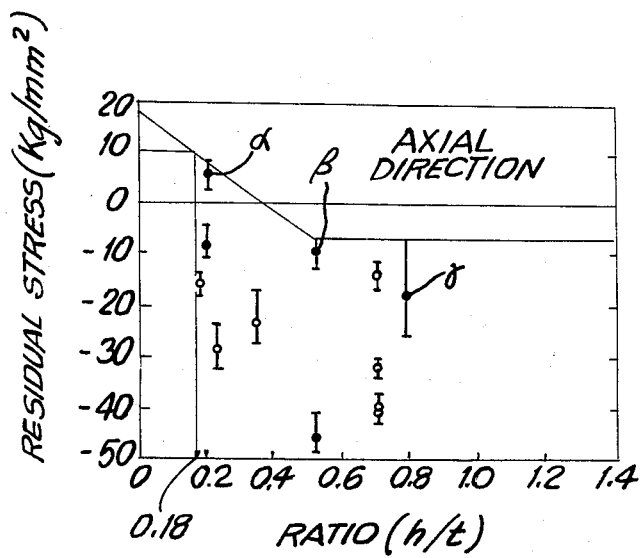

FIGS. 4 and 5 are graphs showing the relationship between the ratio h/t and the stress developed at the inner surface of a pipe (the residual stress including the residual stress at the weld 2). An open circle shows a residual stress when there exists no welded joint (that is, the residual stress developed when a build-up weld is formed) while a solid circle shows the stress when there exists a welded joint. FIG. 4 shows the circumferential stresses while FIG. 5 shows the axial residual stresses.

From FIG. 4 it is seen that the welded joints all have the compressive stresses regardless of the ratio h/t. Therefore, the circumferential residual stresses are satisfactorily relieved.

From FIG. 5 it is seen that when there exists a welded joint, the lower the ratio h/t, the higher the tensile residual stress becomes. In FIG. 5, the points $\alpha$, $\beta$ and $\gamma$ which may be regarded to ensure the safety are selected. The line interconnecting the maximum values of the typical points $\alpha$ and $\beta$ and the line interconnecting the maximum values of the typical point $\beta$ and $\gamma$ are regarded as the residual stresses when the ratio h/t is varied.

In practice, the residual tensile stress at a weld on the order of 10 kg/mm² may be satisfactory. When the ratio h/t=0.18, the tensile stress of 10 kg/mm² can be obtained.

That is, the ratio h/t is higher than approximate 0.2 the residual stresses at the weld 2 can be satisfactorily relieved.

Figure 6:
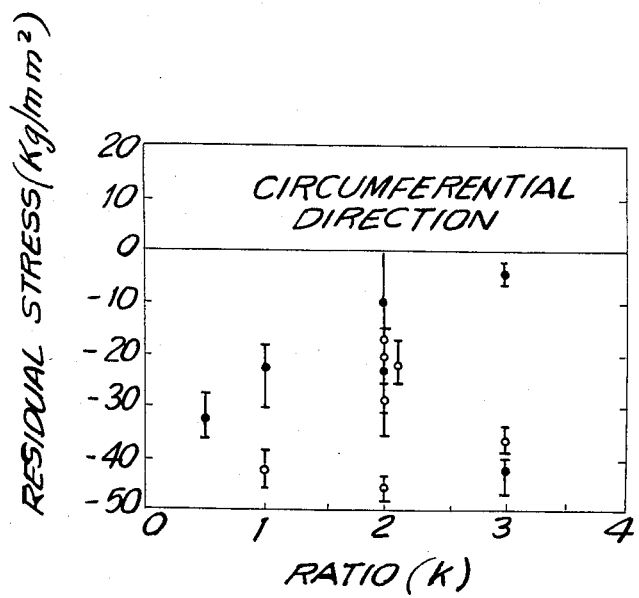
Figure 7:
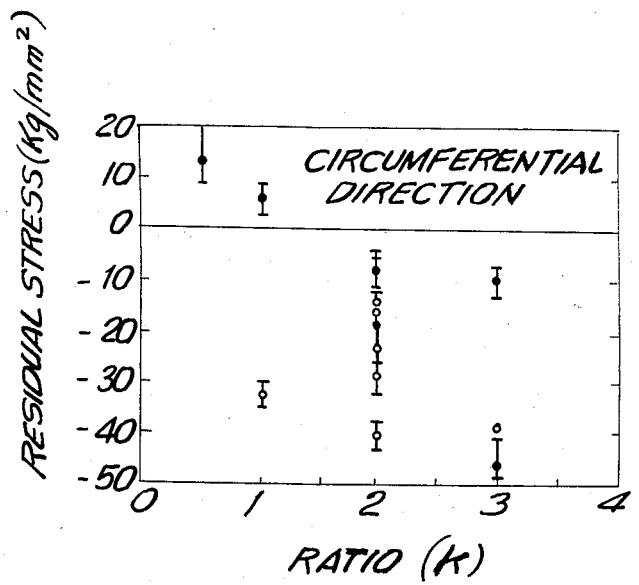

FIGS. 6 and 7 show the relationship between the residual stress and the ratio $L/\sqrt{Rt}=K$. FIG. 6 shows the circumferential residual stress while FIG. 7 shows the axial residual stress. An open circle shows a residual stress when there exists no welded joint while a solid circle shows a residual stress when there exists a welded joint.

From FIG. 6 it is seen that regardless of the ratio $L/\sqrt{Rt}=K$ the circumferential residual stress is compressive when there exists a welded joint.

From FIG. 7 it is seen that when there is a welded joint, as the ratio $L/\sqrt{Rt}=K$ is decreased, the residual stress becomes tensile. From FIG. 7, the ratio K which ensures safety is approximate 1. The value 1 corresponds to the maximum value of the curve obtained from Eq. (1) and shown in FIG. 3. Furthermore, at the value of 1, the compressive stress obtained by Eq. (3) exceeds the tensile stress obtained by Eq. (1). Thus there exists no contradiction.

In the above described explanation of experiments, the heat input when the build-up welding is made has not been taken into consideration, but it is to be understood that under normal welding conditions there is almost no influence due to welding heat input when a cooling water flows through the pipe.

The ratios h/t and K are selected depending upon purposes. For instance, in the case of a device which must have a high degree of reliability, the ratio K=2.

As described above, according to the present invention, a welding machine can be used to relieve the residual stresses at the inner surface of a weld. The present invention does not need a large-sized device. Furthermore the sizes of build-up welded portions can be controlled so that the residual stresses can be relieved in a satisfactory manner.

What is claimed is:

1. A method of relieving residual stresses at a joint of a pipe having an outer surface, comprising: build-up welding a portion at the joint on the outer surface of the pipe, with a ratio h/t higher than approximately 0.2, and a ratio $L/\sqrt{Rt}$ higher than approximately 1, wherein h denotes height of the buildup weld portion; t the wall thickness of the pipe; L the width of the build-up welded portion; and R the radius of the pipe.

* * * * *